(12) United States Patent
Nakanishi et al.

(10) Patent No.: US 12,242,115 B2
(45) Date of Patent: Mar. 4, 2025

(54) CABLE WITH CONNECTOR

(71) Applicant: SUMITOMO ELECTRIC INDUSTRIES, LTD., Osaka (JP)

(72) Inventors: Tetsuya Nakanishi, Osaka (JP); Takayuki Shimazu, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 53 days.

(21) Appl. No.: 17/560,958

(22) Filed: Dec. 23, 2021

(65) Prior Publication Data
US 2022/0206229 A1    Jun. 30, 2022

(30) Foreign Application Priority Data
Dec. 25, 2020  (JP) ................. 2020-217223

(51) Int. Cl.
*G02B 6/38* (2006.01)
*G02B 6/44* (2006.01)

(52) U.S. Cl.
CPC ......... *G02B 6/3885* (2013.01); *G02B 6/3897* (2013.01); *G02B 6/443* (2013.01)

(58) Field of Classification Search
CPC .... G02B 6/3885; G02B 6/3897; G02B 6/443; G02B 6/4442; G02B 6/403; G02B 6/3887; G02B 6/44528; G02B 6/4433
USPC ................ 385/78, 84, 89, 92, 94, 100, 107, 385/110–113, 134–136, 139
See application file for complete search history.

(56) References Cited

U.S. PATENT DOCUMENTS

| | | | | |
|---|---|---|---|---|
| 5,863,083 A | * | 1/1999 | Giebel ................ | G02B 6/4465 385/136 |
| 7,680,388 B2 | * | 3/2010 | Reagan ............... | G02B 6/4441 398/16 |
| 2009/0304339 A1 | * | 12/2009 | Ohtsuka ............. | G02B 6/4475 385/100 |
| 2012/0106906 A1 | | 5/2012 | Sakabe et al. | |
| 2019/0004273 A1 | | 1/2019 | Faulkner et al. | |
| 2019/0170931 A1 | | 6/2019 | Sakamoto et al. | |
| 2019/0361184 A1 | * | 11/2019 | Kamath .............. | G02B 6/4432 |
| 2020/0249404 A1 | | 8/2020 | Otomitsu et al. | |
| 2021/0003774 A1 | * | 1/2021 | Hayashi ............ | G02B 6/03627 |

FOREIGN PATENT DOCUMENTS

| | | | |
|---|---|---|---|
| JP | S63-182611 A | | 7/1988 |
| JP | H09-127345 A | | 5/1997 |
| JP | H09-265032 A | | 10/1997 |
| JP | 2001-004888 A | | 1/2001 |
| JP | 2001-013365 A | | 1/2001 |
| JP | 2015-052704 A | | 3/2015 |
| WO | WO-2018/008399 A1 | | 1/2018 |
| WO | WO-2021199736 A1 | * | 10/2021 ........... G02B 6/4401 |

* cited by examiner

*Primary Examiner* — Leslie C Pascal
(74) *Attorney, Agent, or Firm* — Faegre Drinker Biddle & Reath LLP

(57) ABSTRACT

A cable with a connector includes a plurality of multicore optical fibers and a plurality of connectors attached to ends of the plurality of multicore optical fibers. The connectors are multi-fiber connectors, and a core number density of each of the plurality of connectors is 2 cores/mm$^2$ or more. The cable further includes a sheath that collectively covers the plurality of multicore optical fibers.

8 Claims, 7 Drawing Sheets

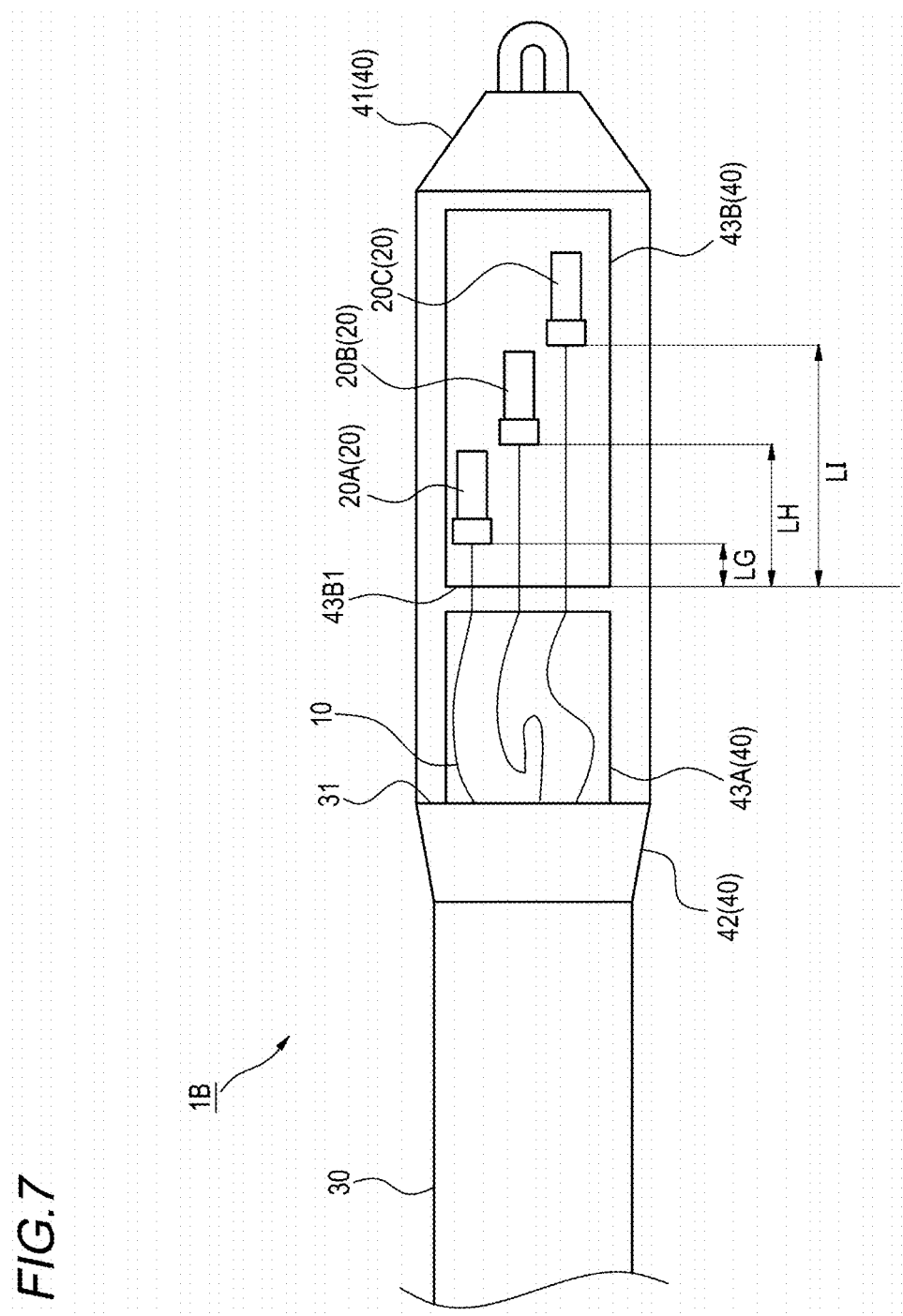

CABLE WITH CONNECTOR

CROSS REFERENCE TO RELATED APPLICATIONS

This application is based on Japanese Patent Applications No. 2020-217223 filed on Dec. 25, 2020, the entire contents of which are incorporated herein by reference.

TECHNICAL FIELD

The present disclosure relates to a cable with a connector.

BACKGROUND ART

JP-A-2001-004888 discloses an optical cable towing tool used for towing and laying a cable with a connector. The optical cable towing tool of JP-A-2001-004888 houses a plurality of optical connectors that terminate a plurality of optical fiber tips to be connectable to the connectors. Therefore, after an optical cable is towed and laid in a duct, it is easy to connect the optical cable to another optical fiber or the like.

In recent years, in order to increase transmission capacity of cables, there is an increasing demand for an ultra-high-fiber-count optical cable having 100 or more, or 1000 or more cores in an optical fiber per optical fiber cable. When such an ultra-high-fiber-count optical cable is towed by the optical cable towing tool of Patent Literature 1, the following problem occurs.

The optical cable towing tool of JP-A-2001-004888 is used for a single-core optical fiber having one core in one optical fiber, and houses a plurality of connectors each corresponding to one core. When the optical cable towing tool of JP-A-2001-004888 is used for the ultra-high-fiber-count optical cable, the number of the connectors increases, and as a result, the entire optical cable towing tool becomes thick and long. Such an optical cable towing tool having an excessively large dimension is particularly difficult to pass through a bent duct, and cannot appropriately tow the ultra-high-fiber-count optical cable.

Therefore, the present disclosure provides an ultra-high-fiber-count optical cable, which is a cable with a connector and can be towed by a small optical cable towing tool.

SUMMARY OF INVENTION

According to an aspect of the disclosure, a cable with a connector includes a plurality of multicore optical fibers, and a plurality of connectors attached to ends of the plurality of multicore optical fibers.

The present disclosure can provide an ultra-high-fiber-count optical cable, which is a cable with a connector and can be towed by a small optical cable towing tool.

BRIEF DESCRIPTION OF DRAWINGS

FIG. 7 is a plan view illustrating Modification 2 of the cable with a connector of the present disclosure.

DETAILED DESCRIPTION OF EMBODIMENTS

Description of Embodiments of Present Disclosure

Figure 1A:
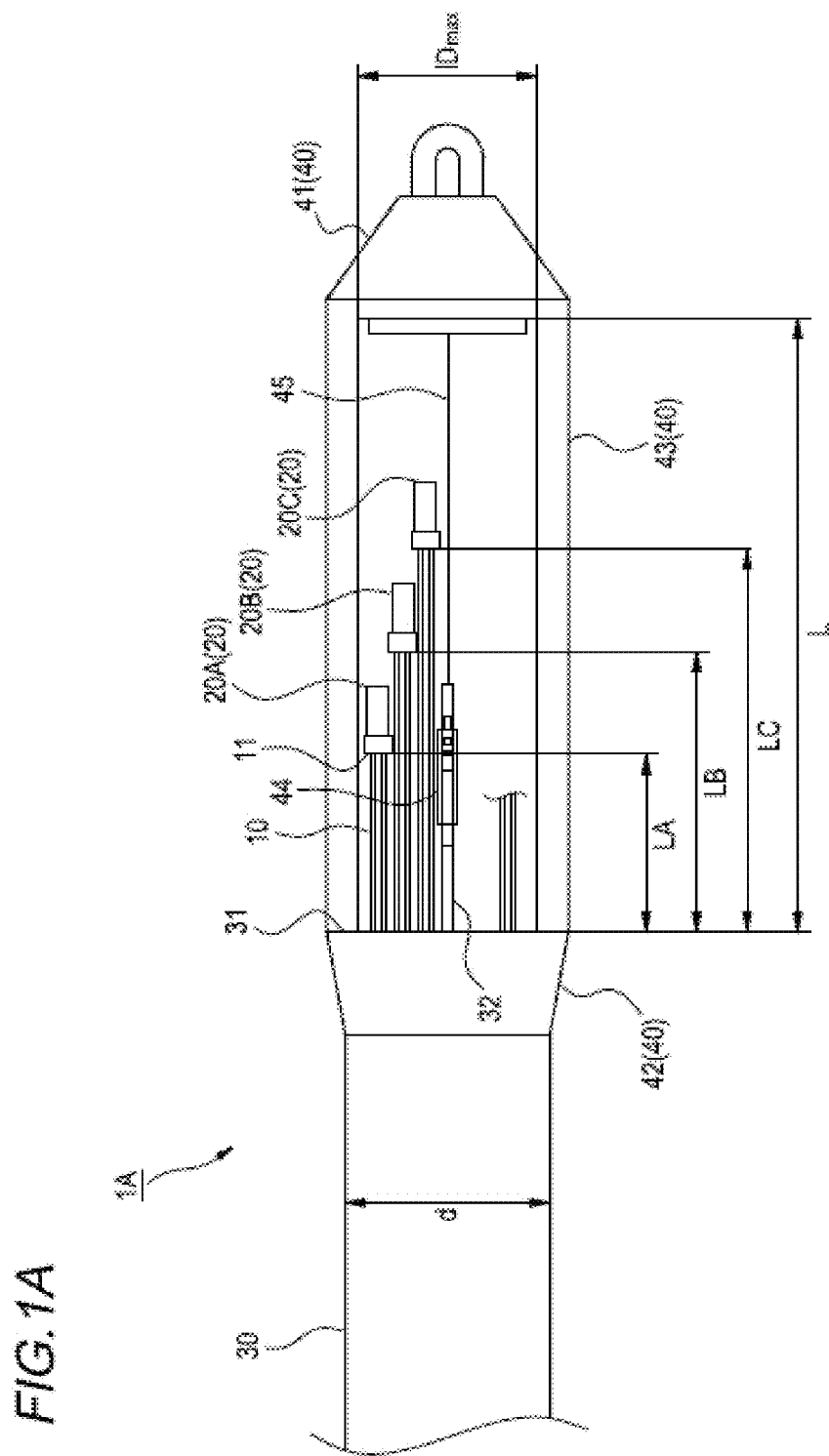
FIG. 1A is a plan view of a cable with a connector according to a first embodiment of the present disclosure.

First, embodiments of the present disclosure will be listed and described.

(1) A cable with a connector according to one aspect of the present disclosure includes a plurality of multicore optical fibers and a plurality of connectors attached to ends of the plurality of multicore optical fibers.

According to the cable with a connector of this aspect, it is not necessary to arrange a large number of connectors each corresponding to one core, and it is sufficient to provide connectors according to the number of the multicore optical fibers. That is, the number of connectors per cable can be reduced. Since the number of connectors housed in an optical cable towing tool can be reduced, it is possible to achieve an ultra-high-fiber-count optical cable that can be towed even by a small optical cable towing tool without reducing the number of cores per cable.

(2) The plurality of connectors are multi-fiber connectors, and a core number density of each of the plurality of connectors may be 2 cores/mm$^2$ or more.

According to this aspect, a cable with a connector in which a plurality of multicore optical fibers are mounted at a high density can be achieved. When the cable with a connector includes a single-core optical fiber, in order to achieve the core number density of 2 cores/mm$^2$ or more in a general multi-fiber connector, it is necessary to provide a multi-fiber connector that collectively splices 36 optical fibers for the cable with a connector. However, the multi-fiber connector that collectively splices 36 optical fibers is generally expensive, and it is also difficult to ensure hole forming accuracy. Since the optical fiber included in the cable with a connector of the present disclosure is a multicore optical fiber, it is possible to achieve the core number density of 2 cores/mm$^2$ or more without using the multi-fiber connector that collectively splices 36 optical fibers.

(3) The cable with a connector of the present disclosure may further include a sheath that collectively covers the plurality of multicore optical fibers. The plurality of multicore optical fibers includes a first multicore optical fiber and a second multicore optical fiber, and the plurality of connectors may include a first optical connector attached to one end of the first multicore optical fiber and a second optical connector attached to one end of the second multicore optical fiber. A length of the first multicore optical fiber from one end of the sheath to the first connector may be different from a length of the second multicore optical fiber from the one end of the sheath to the second connector.

According to this aspect, the plurality of connectors is not arranged at one position in a longitudinal direction of the cable with a connector. Therefore, it is possible to prevent a diameter of an optical fiber towing tool from increasing.

(4) The cable with a connector according to the present disclosure may further include a tensile member embedded in the sheath or a tensile member covered with the sheath together with the multicore optical fibers, and a towing tool. The towing tool includes a housing portion housing the plurality of multicore optical fibers and the plurality of connectors, a towing portion provided at one end of the housing portion, and a tensile member gripping portion connected to the towing portion via a tension transmitting member and gripping the tensile member.

According to this aspect, the number of connectors can be reduced, and it is possible to prevent a diameter and a length of the housing portion from increasing. An outer diameter of the cable with a connector and a diameter of the sheath gripping portion can also be reduced. Accordingly, a cable with a connector provided with an optical fiber towing tool including miniaturized housing portion and sheath gripping portion can be achieved.

(5) In the cable with a connector of the present disclosure, a maximum value $ID_{MAX}$ of an inner diameter of the housing portion and a total number N of cores in the cable with a connector satisfy an inequality: $(ID_{MAX}/2)^2 \times \pi/N < 0.25$ [mm$^2$].

According to this aspect, the number of connectors housed in the housing portion can be reduced, and the maximum value $ID_{MAX}$ of the inner diameter of the housing portion can be reduced. The total number N of cores in the cable can also be increased. Accordingly, according to this aspect, a cable with a connector that is provided with a miniaturized optical fiber towing tool and satisfies $(ID_{MAX}/2)^2 \times \pi/N < 0.25$ [mm$^2$] can be achieved.

(6) The maximum value of the inner diameter of the housing portion may be smaller than an outer diameter of the sheath.

According to this aspect, a cable with a connector provided with an optical fiber towing tool including a miniaturized housing portion can be achieved.

(7) In the cable with a connector, a length L of the housing portion in the longitudinal direction of the cable with a connector and the total number N of cores in the cable with a connector satisfy an inequality: L/N<0.4 [mm].

According to this aspect, the number of connectors housed in the housing portion can be reduced, and the length L of the housing portion can be reduced. The total number N of cores in the cable can also be increased. Accordingly, according to this aspect, a cable with a connector that is provided with a miniaturized optical fiber towing tool and satisfies L/N<0.4 [mm] can be achieved. The length L of the housing portion under a case where a single-core optical fiber is used for the cable with a connector is three times or more longer than that under a case where a multicore fiber is used. When a single-core optical fiber is used for the cable with a connector, in order to reduce the number of connectors and reduce the length L of the housing portion, it is necessary to prepare an expensive connector, such as a multi-fiber connector that collectively splices 144 fibers or 36 optical fibers, as a connector of the cable with a connector. However, these multi-fiber connectors are generally expensive, and it is also difficult to ensure the hole forming accuracy. According to this aspect, L/N<0.4 [mm] can be satisfied without using any expensive multi-fiber connector.

(8) The housing portion may include a first housing portion and a second housing portion. The first housing portion may house the plurality of multicore optical fibers in a bent state, and the second housing portion may house the plurality of multicore optical fibers along the longitudinal direction of the cable with a connector. The second housing portion may house the plurality of connectors.

According to this aspect, it is possible to adjust an extra length of the multicore optical fibers in the first housing portion.

(9) In the cable with a connector of the present disclosure, a plurality of connectors may be grouped together in a predetermined number to form at least one multiple connector.

The cable with a connector according to this aspect facilitates a connection work with other connectors. Compared with a case where each multi-fiber connector is connected to another connector, the number of connection works can be reduced.

(10) In the cable with a connector of the present disclosure, the at least one multiple connector includes a first multiple connector and a second multiple connector, and a length of the multicore optical fiber from the one end of the sheath to the first multiple connector may be different from a length of the multicore optical fiber from the one end of the sheath to the second multiple connector.

In the cable with a connector of this aspect, a plurality of multiple connectors are not arranged at one position in the longitudinal direction of the cable with a connector. Therefore, it is possible to prevent the diameter of the optical fiber towing tool from increasing.

Details of First and Second Embodiment of Present Disclosure

A cable with a connector according to an embodiment of the present disclosure will be described with reference to the drawings.

The present disclosure is not limited to these examples, but is defined by the claims, and is intended to include all modifications within the scope and meaning equivalent to the claims.

Figure 1B:
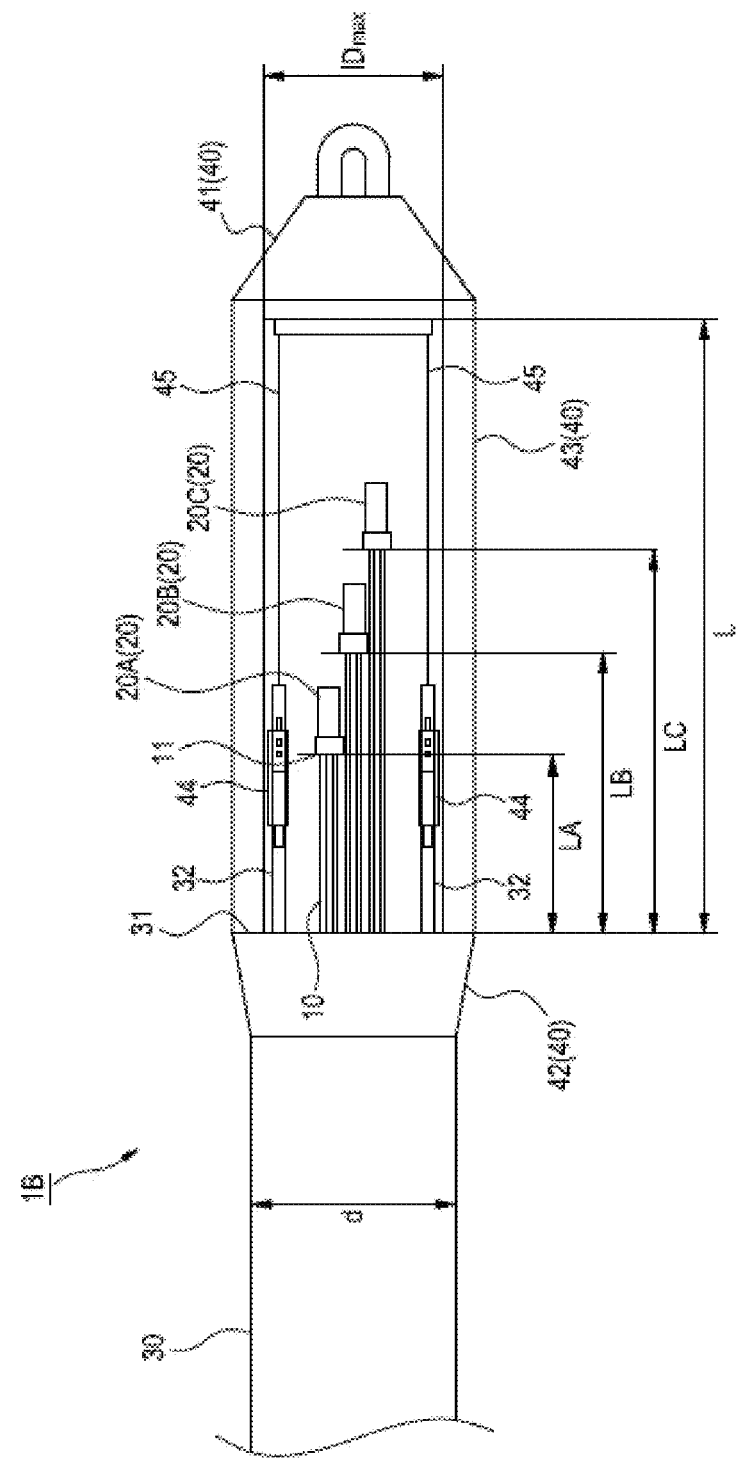
FIG. 1B is a plan view of a cable with a connector according to a second embodiment of the present disclosure.

FIG. 1A is a plan view of a cable 1A with a connector according to one embodiment of the present disclosure. FIG. 1B is a plan view of a cable 1B with a connector according to one embodiment of the present disclosure. In the following, in a case where there is no need to distinguish the cable 1A and the cable 1B, a cable 1 is used which may be the cable 1A or the cable 1B. The cable 1 with a connector includes a plurality of optical fibers 10, a plurality of connectors 20, and a sheath 30 covering the plurality of optical fibers 10. The cable 1 with a connector may further include a tensile member 32 and a towing tool 40 attached to one end of the cable 1 with a connector. The cable 1A with the connector is a slot type cable on which the plurality of optical fibers 10 is mounted in a slot groove, and the tensile member 32 is covered along the optical fibers 10 with a sheath 30. The cable 1B with a connector is a slot-less type cable in which the plurality of optical fibers 10 is mounted at a high density in the sheath 30 instead of the slot and an tensile member 32 is embedded in a sheath 30. An outer diameter d of the sheath 30 is, for example, 50 mm.

Figure 2:
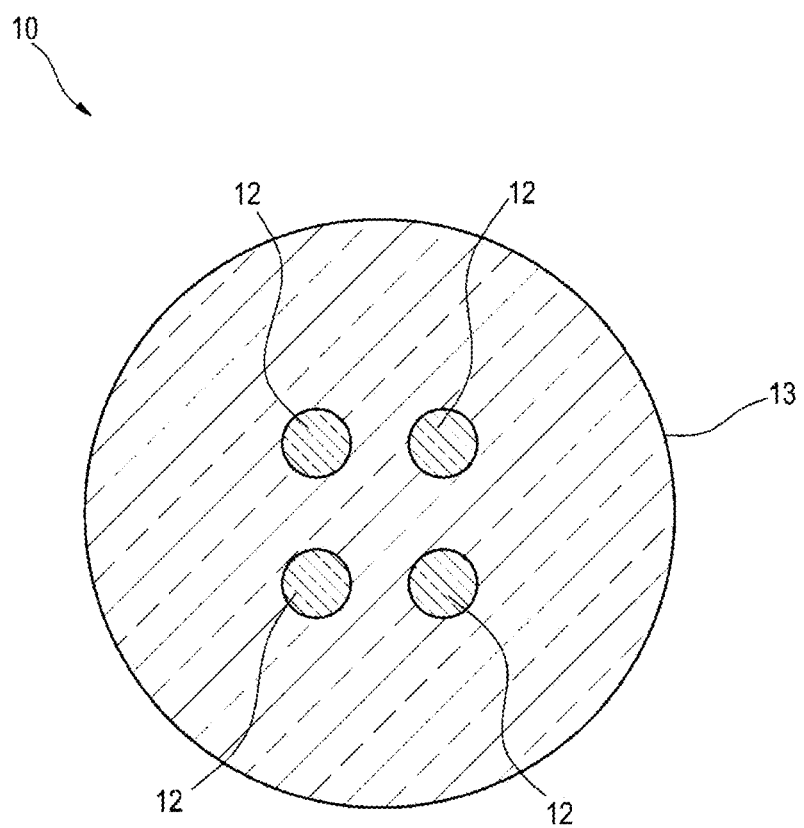
FIG. 2 is a cross-sectional view of a multicore optical fiber included in the cable with a connector illustrated in FIGS. 1 and 2.

The plurality of optical fibers 10 protrude from one end 31 of the sheath 30 and are arranged along a longitudinal direction of the cable 1 with a connector. The plurality of optical fibers have the same structure. Each optical fiber 10 is a multicore fiber including a plurality of cores. FIG. 2 is a cross-sectional view illustrating a glass fiber portion of one optical fiber 10. The optical fiber 10 has a circular shape in a cross-sectional view in a radial direction, and includes a plurality of cores 12 and a cladding 13 collectively surrounding the plurality of cores 12. A main component of the cores 12 and the cladding 13 in the optical fiber 10 is quartz glass. A refractive index of the cladding 13 is lower than that of each core 12. The optical fiber 10 may be configured to prevent an optical signal from leaking from the cores 12 when the optical fiber 10 is bent. For example, the optical fiber 10 may include a trench having a refractive index lower than that of the cladding 13 between each core 12 and the cladding 13.

The optical fiber 10 of this example includes four cores 12, but the number of the cores 12 is not limited to four. The optical fiber 10 may have at least two cores 12, but preferably has four or more cores 12. More preferably, the number of cores 12 is 8, 12, and 16. An outer diameter of the optical fiber 10 in this example is, for example, 125 µm, and a diameter of each core 12 is, for example, 8 µm. The plurality of optical fibers 10 may have a form of a fiber ribbon with fiber adhesive parts and non-adhesive parts.

The description of the cable 1 with a connector illustrated in FIGS. 1A and 1B will be continued. The plurality of connectors 20 are connection terminals attached to respective ends 11 of the plurality of optical fibers 10 in the longitudinal direction of the cable 1 with a connector, and are multi-fiber connectors connecting the plurality of optical fibers 10 to other terminals at once. That is, each connector 20 includes a plurality of ferrules that hold the plurality of optical fibers 10, and one end 11 of each optical fiber 10 is held by one ferrule. In FIGS. 1A and 1B, the plurality of connectors 20 include a first connector 20A, a second connector 20B, and a third connector 20C. The number of the plurality of connectors 20 is not limited.

A removable cap or an openable shutter may be provided at one end of each connector 20. The cap or the openable shutter is an example of a dust-proof structure. The cap or the openable shutter may prevent an external damage to each connector 20. The cap or the openable shutter may be provided at the ends of all the connectors 20, or may be provided at the ends of some of the connectors 20.

A length LA of the optical fiber 10 from the one end 31 of the sheath 30 to the first connector 20A is different from a length LB of the optical fiber 10 from the one end 31 of the sheath 30 to the second connector 20B. A length LC of the optical fiber 10 from the one end 31 of the sheath 30 to the third connector 20C is different from the length LA and the length LB. In other words, the plurality of connectors 20 are arranged at regular intervals in the longitudinal direction of the cable 1 with a connector so as not to be concentrated at the same position.

In the cable 1 with a connector of this example, a core number density of each connector 20 is 2 cores/mm$^2$ or more. For example, when each optical fiber 10 includes four cores 12, each connector 20 includes eight multicore optical fibers, and a cross-sectional area of each connector ferrule is 16 mm$^2$, the core number density in each connector 20 is 4 cores×8/16 mm$^2$=2 cores/mm$^2$. Here, the cross-sectional area of connector ferrule means the maximum value of the cross-sectional area that is perpendicular to the optical fibers.

The towing tool 40 is provided with, in the longitudinal direction of the cable 1 with a connector, a distal end portion (towing portion) 41 arranged at one end of the towing tool 40, a sheath gripping portion 42 arranged at the other end of the towing tool 40, a housing portion 43 arranged between the distal end portion 41 and the sheath gripping portion 42, the tensile member gripping portion 44, the tensile transmitting member 45.

The distal end portion 41 has a circular shape in a cross-sectional view in the radial direction, and is towed by a winder such as a winch at a distal end of the distal end portion 41. The distal end of the distal end portion 41 may be provided with an annular portion or a hook coupled to the winder. An outer diameter of the distal end portion 41 is set according to a traction force of the winder. The distal end portion 41 is coupled to the housing portion 43. A waterproof tape or a dustproof tape may be provided between the distal end portion 41 and the housing portion 43.

The sheath gripping portion 42 has a circular shape in a cross-sectional view in the radial direction, and grips a sheath 30 of the cable 1 with a connector. The sheath gripping portion 42 is coupled to the housing portion 43. A waterproof tape or a dustproof tape may be provided between the sheath gripping portion 42 and the sheath 30 of the cable 1 with a connector, and between the sheath gripping portion 42 and the housing portion 43.

The tensile member gripping portion 44 is fixed to the distal end portion (towing portion) 41 via the tension transmitting member. The tensile member gripping portion 44 holds the tensile member 32 exposed from the cable 1 with the connector, and transmits the tension to the cable 1 with the connector. The sheath gripping portion 42 may be used as the tensile member gripping portion by gripping the tensile member 32 with the sheath gripping portion 42. In this case, a sheath of the housing portion 43 functions as the tension transmitting member.

The housing portion 43 has a circular shape in a cross-sectional view in the radial direction, and houses the plurality of optical fibers 10 and the plurality of connectors 20 of the cable 1 with a connector. A maximum value $ID_{MAX}$ of an inner diameter of the housing portion 43 may be smaller than the outer diameter d of the sheath 30.

It is assumed that the number of cores in the cable 1 with a connector is N. More specifically, assuming that the number of the plurality of optical fibers 10 is n and the number of cores per optical fiber is c, the cable 1 with a connector has the number of cores of n×c=N. The maximum value $ID_{MAX}$ of the inner diameter of the housing portion 43 satisfies $(ID_{MAX}/2)^2 \times \pi/N < 0.25$ [mm$^2$]. In the longitudinal direction of the cable 1 with a connector, a length of a space of the housing portion 43 that houses the plurality of optical fibers 10 and the plurality of connectors 20 is defined as L. The length L of the housing portion 43 satisfies L/N<0.4 [mm].

Next, a method for towing the cable 1 with a connector will be described.

When the cable 1 with a connector is towed into a duct, the towing tool 40 is provided at one end of the cable 1 with a connector as illustrated in FIGS. 1A and 1B. The distal end portion 41 of the towing tool 40 is coupled to the winder such as a winch. When the cable 1 with a connector including the towing tool 40 is towed, the winder is driven to transmit a traction force to the distal end portion 41. A withstand load of the cable 1 with a connector to the traction force is preferably 1,000 N or more. The withstand load is more preferably 2,000 N or more. The traction force is transmitted to the tensile member 32 of the cable 1 with a connector gripped by the tensile member gripping portion 44 via the tensile transmitting member 45 and the tensile member gripping portion 44. Then, the cable 1 with a connector including the towing tool 40 is towed in the duct.

Figure 3:
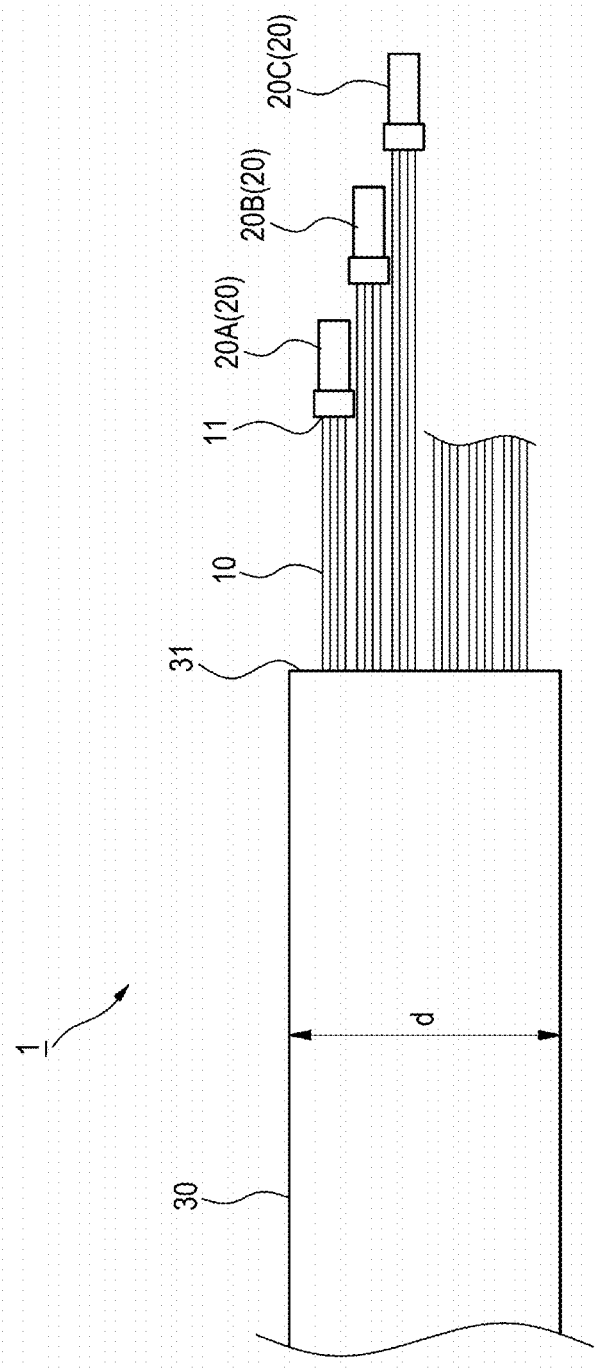
FIG. 3 is a plan view illustrating a state in which a towing tool is removed from one end of the cable with a connector illustrated in FIGS. 1 and 2.

When the cable 1 with a connector is towed to a target location, the towing tool 40 is removed from the one end of the cable 1 with a connector. FIG. 3 is a plan view of the cable 1 with a connector in a state where the towing tool 40 is removed. A part of the plurality of optical fibers 10 and the plurality of connectors 20 are exposed. The plurality of exposed connectors 20 are connected to connectors of another cable. For example, the cable 1 with a connector is towed to a closure. After the towing, the towing tool 40 is removed from one end of the cable 1 with a connector. A part of the plurality of exposed optical fibers 10 and the plurality of exposed connectors 20 may be connected to the connectors of the another cable in the closure. By repeating the towing to the closure and the connection to another cable in this way, the cable can be laid over a long distance.

As described above, since the cable 1 with a connector uses the optical fibers 10, which are multicore fibers, the number of connectors can be reduced as compared with a case where single-core fibers are used. Particularly, the cable 1 with a connector does not need to include a large number of connectors each corresponding to one core, and only need to include a plurality of connectors 20 corresponding to the number of the optical fibers 10 including the plurality of cores 12. Since the number of connectors 20 housed in the housing portion 43 of the towing tool 40 is reduced, the towing tool 40 can be miniaturized. Therefore, the cable 1 with a connector that can be towed by the small towing tool 40 without reducing the number of cores per cable can be achieved.

Since the core number density in each connector 20 is 2 cores/mm² or more, the cable 1 with a connector in which the plurality of optical fibers 10 are mounted at a high density can be achieved. When the cable 1 with a connector uses the single-core optical fiber, in order to achieve the core number density of 2 cores/mm² or more, the cable 1 with a connector needs to include the multi-fiber connector that collectively splices the 36 optical fibers. However, the multi-fiber connector that collectively splices 36 optical fibers is generally expensive, and it is also difficult to ensure forming accuracy of holes that house the ferrules. According to the present disclosure, the core number density of 2 cores/mm² or more can be achieved without using any expensive multi-fiber connector.

Since the length LA of the optical fiber 10 from the one end 31 of the sheath 30 to the first connector 20A is different from the length LB of the optical fiber 10 from the one end 31 of the sheath 30 to the second connector 20B, the plurality of connectors 20 are not concentrated at one position. Therefore, it is possible to prevent the diameter of the housing portion 43 of the towing tool 40 from increasing.

Since the housing portion 43 of the towing tool 40 houses the plurality of optical fibers 10, which are multicore fibers, and the plurality of connectors 20, which are multi-fiber connectors, the number of connectors 20 can be reduced and the diameter and a length of the housing portion 43 can be prevented from increasing as compared with a case where single-core fibers and single-fiber connectors are housed. Since each optical fiber 10 is a multicore fiber, the outer diameter d of the cable 1 with a connector and a diameter of the sheath gripping portion 42 can also be reduced. Accordingly, the cable 1 with a connector including miniaturized housing portion 43 and sheath gripping portion 42 can be achieved.

Each optical fiber 10 is a multicore fiber. Therefore, the number of connectors 20 housed in the housing portion 43 can be reduced, and the maximum value $ID_{MAX}$ of the inner diameter of the housing portion 43 can be reduced. The total number N of cores in the cable can also be increased. Accordingly, it is possible to achieve the cable 1 with a connector that includes the miniaturized optical fiber towing tool 40 and satisfies $(ID_{MAX}/2)^2 \times \pi/N < 0.25$ [mm²].

Since the maximum value $ID_{MAX}$ of the inner diameter of the housing portion 43 is smaller than the outer diameter d of the sheath 30, the housing portion 43 of the towing tool 40 can be miniaturized.

Each optical fiber 10 is a multicore fiber. Therefore, the number of connectors 20 housed in the housing portion 43 can be reduced, and the length L of the housing portion 43 can be reduced. The total number N of cores in the cable can also be increased. Accordingly, it is possible to achieve the cable 1 with a connector that includes the miniaturized optical fiber towing tool 40 and satisfies L/N<0.4 [mm]. When a single-core optical fiber is used for the cable 1 with a connector, the length L of the housing portion 43 is three times or more longer than that in a case where the multicore fiber is used. However, since the cable 1 with a connector satisfies L/N<0.4 [mm], the housing portion 43 of the towing tool 40 can be miniaturized.

When a single-core optical fiber is used for the cable with a connector, the cable with a connector needs to include an expensive connector such as a multi-fiber connector that collectively splices 144 or 36 optical fibers. However, these multi-fiber connectors are generally expensive, and it is also difficult to ensure the hole forming accuracy. Since each optical fiber 10 of the cable with a connector of the present disclosure is a multicore fiber, L/N<0.4 [mm] can be satisfied without using any expensive multi-fiber connector.

(Modification 1)

Figure 4:
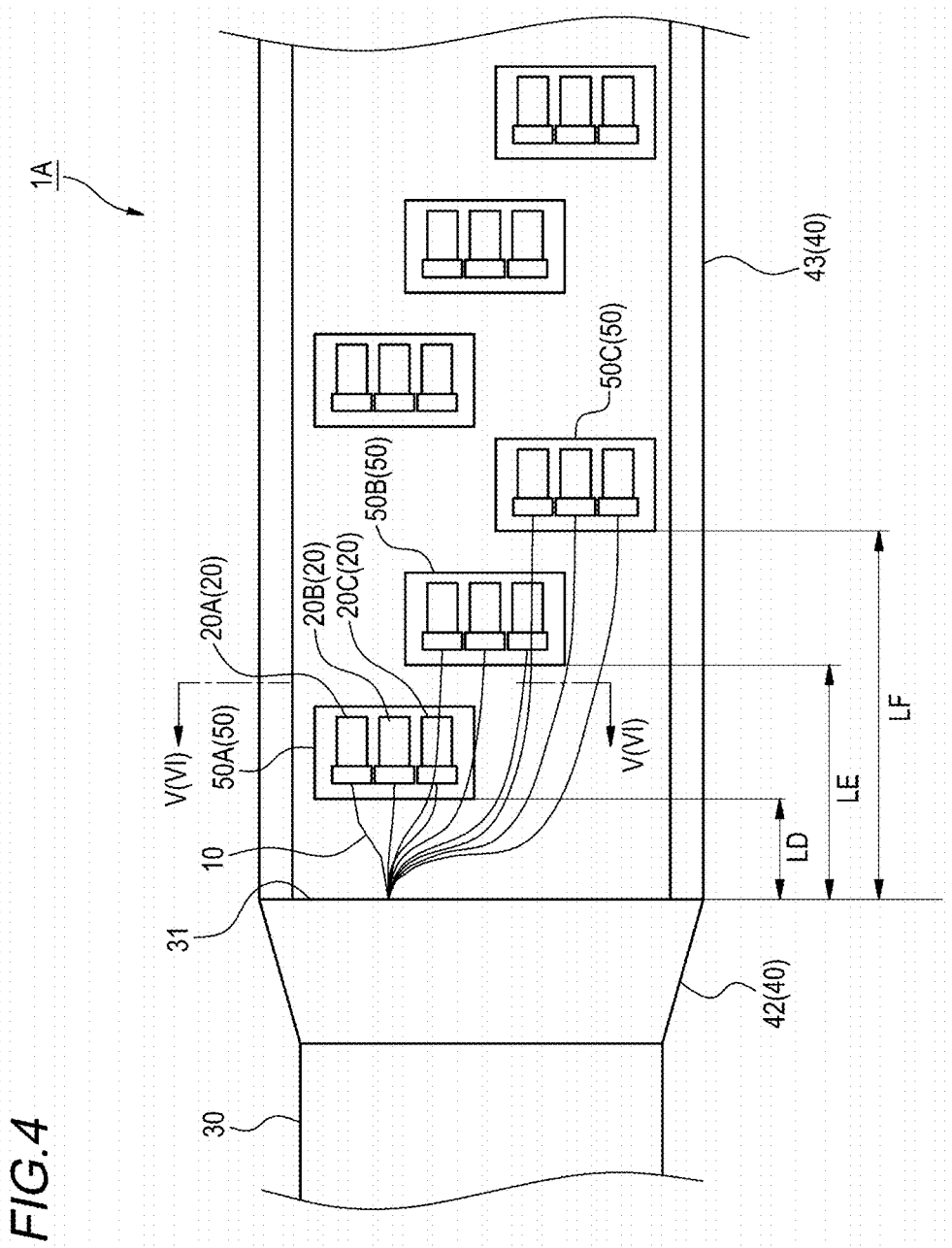
FIG. 4 is a schematic diagram illustrating Modification 1 of the cable with a connector of the present disclosure.

FIG. 4 illustrates a cable 1A with a connector including a multiple connector 50 as Modification 1 of the cable with a connector. In FIG. 4, components substantially the same as or corresponding to configurations illustrated in FIG. 1 are denoted by the same reference numerals, and repeated description thereof will be omitted. The plurality of optical fibers 10 are illustrated in a simplified manner.

The cable 1A with a connector includes at least one multiple connector 50 connected to the plurality of optical fibers 10 and collectively connecting the plurality of connectors 20. In this example, the cable 1A with a connector includes a plurality of multiple connectors 50. The plurality of multiple connectors 50 include a first multiple connector 50A, a second multiple connector 50B, and a third multiple connector 50C. Each multiple connector 50 may be provided with a label distinguishable from other multiple connectors 50. The number of the plurality of multiple connectors 50 is not limited.

Each multiple connector 50 houses the plurality of connectors 20. In FIG. 4, the first multiple connector 50A houses the first connector 20A, the second connector 20B, and the third connector 20C.

A length LD of the optical fiber 10 from the one end 31 of the sheath 30 to the first multiple connector 50A is different from a length LE of the optical fiber 10 from the one end 31 of the sheath 30 to the second multiple connector 50B. A length LF of the optical fiber 10 from the one end 31 of the sheath 30 to the third multiple connector 50C is different from the length LD and the length LE. In other words, the plurality of multiple connectors 50 are arranged at regular intervals in a longitudinal direction of the cable 1A with a connector so as not to be concentrated at the same position.

Figure 5:
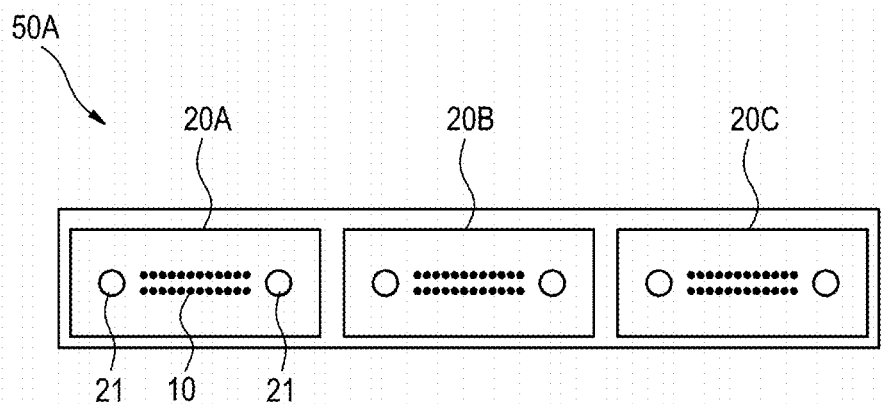
FIG. 5 is a schematic diagram illustrating a distal end portion of a multiple connector included in Modification 1 of the cable with a connector of the present disclosure.

FIG. 5 is a schematic diagram of a distal end portion of the first multiple connector 50A when viewed from the distal end portion 41 toward the sheath gripping portion 42. In the first multiple connector 50A, the first connector 20A, the second connector 20B, and the third connector 20C are arranged side by side in a horizontal row. Each connector 20 includes a pair of guide pins 21. Each optical fiber 10 is held between the pair of guide pins 21 by a corresponding ferrule. In the first multiple connector 50A, the connectors 20 are arranged horizontally such that the pairs of guide pins 21 are aligned on one plane, but the connectors 20 is not limited to being arranged horizontally. The connectors 20 may be arranged vertically such that the pairs of guide pins 21 are stacked.

Figure 6:
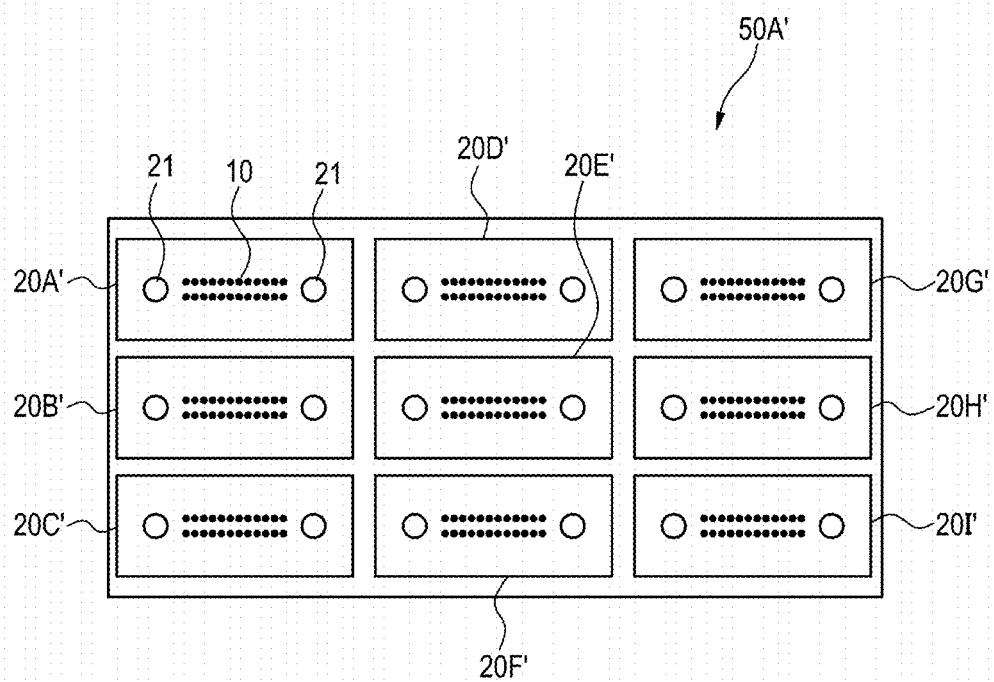
FIG. 6 is a schematic diagram illustrating a distal end portion of a modification of the multiple connector.

An arrangement direction of the connectors 20 in the first multiple connector 50A may be a vertical row. The number of connectors housed in each multiple connector 50 is not limited to three. FIG. 6 is a schematic diagram of a distal end portion of a first multiple connector 50A', which is a modification, when viewed from the distal end portion 41 toward the sheath gripping portion 42. The first multiple connector 50A' includes a first connector 20A', a second connector 20B', a third connector 20C', a fourth connector 20D', a fifth connector 20E', a sixth connector 20F', a seventh connector 20G', an eighth connector 20H', and a ninth connector 20I'. In the first multiple connector 50A', the first connector 20A', the second connector 20B', and the third connector 20C' are arranged in a vertical row. Similarly, the fourth connector 20D', the fifth connector 20E', and the sixth connector 20F' are arranged in a vertical row. The seventh connector 20G', the eighth connector 20H', and the ninth connector 20I' are arranged in a vertical row. In other words, the first connector 20A' to the ninth connector 20I' in the first multiple connector 50A' are housed in a state of being arranged in three rows and three columns.

As described above, since the cable 1A with a connector includes at least one multiple connector 50, the cable 1A with a connector facilitates connection work with another connector. When the cable 1A with a connector does not include a multiple connector, it is necessary to perform the connection work three times to connect the multi-fiber connectors 20A, 20B, and 20C to other connectors, but in the present disclosure, the connection work to the multiple connector 50A only need to be performed once. Therefore, the number of times of connection work can be reduced.

Since the cable 1A with a connector includes the plurality of multiple connectors 50, and the length LD of the optical fiber 10 from the one end 31 of the sheath 30 to the first multiple connector 50A is different from the length LE of the optical fiber 10 from the one end 31 of the sheath 30 to the second multiple connector 50B, the plurality of multiple connectors 50 are not arranged at one position in the housing portion 43 in the longitudinal direction of the cable 1A with a connector. Therefore, the diameter of the towing tool 40 can be prevented form increasing. When each of the multiple connectors 50 is labeled, each of the multiple connectors 50 can be easily identified.

(Modification 2)

FIG. 7 illustrates a plan view of a cable 1B with a connector in a case where the towing tool 40 includes a plurality of housing portions, as Modification 2 of the cable with a connector. In FIG. 7, components substantially the same as or corresponding to the configurations illustrated in FIG. 1 are denoted by the same reference numerals, and repeated description thereof will be omitted. The plurality of optical fibers 10 are illustrated in a simplified manner.

The housing portion 43 of the towing tool 40 includes a first housing portion 43A and a second housing portion 43B. The first housing portion 43A has a circular shape in a cross-sectional view in a radial direction, and is arranged between the sheath gripping portion 42 and the second housing portion 43B in a longitudinal direction of the cable 1B with a connector. The second housing portion 43B has a circular shape in a cross-sectional view in the radial direction, and is arranged between the first housing portion 43A and the distal end portion 41 in the longitudinal direction of the cable 1B with a connector.

Each optical fiber 10 protruding from the one end 31 of the sheath 30 is housed in a bent state in the first housing portion 43A, and is housed in the second housing portion 43B along the longitudinal direction of the cable 1B with a connector. The connectors 20 are housed in the second housing portion 43B.

One end 43B1 of the second housing portion 43B faces the first housing portion 43A. A length LG of the optical fiber 10 from the one end 43B1 of the second housing portion 43B to the first connector 20A is different from a length LH of the optical fiber 10 from the one end 43B1 of the second housing portion 43B to the second connector 20B. A length LI of the optical fiber 10 from the one end 43B1 of the second housing portion 43B to the third connector 20C is different from the length LG and the length LH. In other words, the plurality of connectors 20 are arranged at regular intervals in the longitudinal direction of the cable 1B with a connector so as not to be concentrated at the same position.

After the towing by the winder, many of the components of the towing tool 40 are removed from the one end of the cable 1 with a connector, but the first housing portion 43A may not be removed and may be left in the vicinity of the one end 31 of the sheath 30.

In this way, since each optical fiber 10 is housed in a bent state in the first housing portion 43A, the first housing portion 43A can tolerate an extra length of each optical fiber 10. For example, even if fiber sheath removal or cutting of the optical fiber 10 fails when the cable 1 with a connector is connected to another cable, it can be supplemented by the fiber length of each optical fiber 10 housed in the first housing portion 43A.

(Evaluation Experiment 1)

The core number density in the connector 20 was evaluated. In Evaluation Experiment 1, Sample Nos. 1 to 4 of the optical fiber 10 were prepared. The number of cores 12 in Sample No. 1 is 4. The number of cores 12 in Sample No. 2 is 8. The number of cores 12 in Sample No. 3 is 12. The number of cores 12 in Sample No. 4 is 16. As a comparative example, an optical fiber of Sample No. 9 was prepared. The number of cores of Sample No. 9 is one, and the optical fiber is a single-core fiber. Further, multi-fiber connectors 20 having 8, 12, 24, and 36 ferrule holes were prepared. Each connector 20 has a cross-sectional area of 16 mm$^2$. Evaluation results of the core number density of each connector 20 in each sample are shown in Table 1.

TABLE 1

| | Core number per optical fiber | | | | |
|---|---|---|---|---|---|
| | No. 9 1 | No. 1 4 | No. 2 8 | No. 3 12 | No. 4 16 |
| Ferrule hole number of each connector | 8 | 0.5 | 2.0 | 4.0 | 6.0 | 8.0 |
| | 12 | 0.8 | 3.0 | 6.0 | 9.0 | 12.0 |
| | 24 | 1.5 | 6.0 | 12.0 | 18.0 | 24.0 |
| | 36 | 2.3 | 9.0 | 18.0 | 27.0 | 36.0 |

The core number densities in Sample Nos. 1 to 4 were all 2 cores/mm$^2$ or more. On the other hand, the core number density in Sample No. 9 was less than 2 cores/mm$^2$ when the number of ferrule holes was 8, 12, or 24. The core number density in Sample No. 9 was 2.3 cores/mm$^2$ when the number of ferrule holes was 36. However, the multi-fiber connector that collectively splices 36 optical fibers is generally expensive, and it is also difficult to ensure the hole forming accuracy. Accordingly, the cable 1 with a connector provided with the optical fibers 10, which are multicore fibers, and the connectors 20, which are multi-fiber connectors, can achieve a core number density of 2 cores/mm² or more without using any expensive multi-fiber connector.

(Evaluation Experiment 2)

A cross-sectional area $(ID_{MAX}/2)^2 \times \pi/N$ [mm²] of the housing portion 43 per core was evaluated. Here, $ID_{MAX}$ is the maximum value of the inner diameter, and N is the total number of cores. In Evaluation Experiment 2, Sample Nos. 1 to 3 and 5 to 7 of the optical fiber 10 were prepared. In Sample No. 1, the number of cores per fiber is 4, and the number of fibers is 864. In Sample No. 2, the number of cores per fiber is 8, and the number of fibers is 432. In Sample No. 3, the number of cores per fiber is 12, and the number of fibers is 288. In Sample No. 7, the number of cores per fiber is 4, and the number of fibers is 216. In Sample No. 5, the number of cores per fiber is 8, and the number of fibers is 108. In Sample No. 6, the number of cores per fiber is 12, and the number of fibers is 72. As comparative examples, Sample Nos. 8 and 9 were prepared. In Sample No. 8, the number of core per fiber is 1, and the number of fibers is 3456. In Sample No. 9, the number of core per fiber is 1, and the number of fibers is 864. Sample Nos. 8 and 9 are single-core fibers. Evaluation results of each sample are shown in Table 2.

TABLE 2

| | Total core number | Core number per fiber | Fiber number | $ID_{MAX}$ [mm] | $(ID_{MAX}/2)^2 \times \pi$ [mm²] | Cross-sectional area [mm²] of housing portion per core |
|---|---|---|---|---|---|---|
| No. 8 | 3456 | 1 | 3456 | 47.0 | 1735 | 0.502 |
| No. 1 | 3456 | 4 | 864 | 23.5 | 434 | 0.126 |
| No. 2 | 3456 | 8 | 432 | 16.6 | 217 | 0.063 |
| No. 3 | 3456 | 12 | 288 | 13.6 | 145 | 0.042 |
| No. 9 | 864 | 1 | 864 | 25.0 | 491 | 0.568 |
| No. 7 | 864 | 4 | 216 | 15.7 | 194 | 0.225 |
| No. 5 | 864 | 8 | 108 | 11.1 | 97 | 0.113 |
| No. 6 | 864 | 12 | 72 | 9.1 | 65 | 0.075 |

It was confirmed that all of Sample Nos. 1 to 3 and 5 to 7 satisfy $(ID_{MAX}/2)^2 \times \pi/N < 0.25$ [mm²]. On the other hand, a cross-sectional area of the housing portion 43 per core of Sample No. 8 is 0.502 [mm²], and a cross-sectional area of the housing portion 43 per core of Sample No. 9 is 0.568 [mm²]. It was confirmed that neither Sample No. 8 nor Sample No. 9 satisfies $(ID_{MAX}/2)^2 \times \pi/N < 0.25$ [mm²]. Since Sample Nos. 8 and 9 are single-core fibers, the number of connectors 20 housed in the housing portion 43 is increased, and as a result, the maximum value $ID_{MAX}$ of the inner diameter of the housing portion 43 becomes large. For example, the maximum value $ID_{MAX}$ of the inner diameter of the housing portion in Sample No. 8 is 1.9 times or more larger than the maximum value $ID_{MAX}$ of the inner diameter of the housing portion 43 in Sample No. 1. The maximum value $ID_{MAX}$ of the inner diameter of the housing portion in Sample No. 9 is 1.5 times or more larger than the maximum value $ID_{MAX}$ of the inner diameter of the housing portion 43 in Sample No. 7. Accordingly, the cable 1 with a connector (Sample Nos. 1 to 3 and 5 to 7) provided with the optical fibers 10, which are multicore fibers, and the connectors 20, which are multi-fiber connectors, can satisfy $(ID_{MAX}/2)^2 \times \pi/N < 0.25$ [mm²].

(Evaluation Experiment 3)

The length L of the housing portion 43 was evaluated. In Evaluation Experiment 3, Sample Nos. 11 to 16 of the optical fiber 10 were prepared. In Sample No. 11, the number of cores per fiber is 4, and the number of fibers is 864. The total number N of cores in the cable 1 with a connector of Sample No. 1 is 3456. In Sample No. 12, the number of cores per fiber is 8, and the number of fibers is 432. The total number N of cores in the cable 1 with a connector of Sample No. 12 is 3456. In Sample No. 13, the number of cores per fiber is 12, and the number of fibers is 288. The total number N of cores in the cable 1 with a connector of Sample No. 13 is 3456. In Sample No. 14, the number of cores per fiber is 4, and the number of fibers is 216. The total number N of cores in the cable 1 with a connector of Sample No. 14 is 864. In Sample No. 15, the number of cores per fiber is 8, and the number of fibers is 108. The total number N of cores in the cable 1 with a connector of Sample No. 15 is 864. In Sample No. 16, the number of cores per fiber is 12, and the number of fibers is 72. The total number N of cores in the cable 1 with a connector of Sample No. 16 is 864.

As comparative examples, Sample Nos. 8 and 9 were prepared. In Sample No. 8, the number of core per fiber is 1, and the number of fibers is 3456. The total number N of cores in the cable 1 with a connector of Sample No. 8 is 3456. In Sample No. 9, the number of core per fiber is 1, and the number of fibers is 864. The total number N of cores in the cable 1 with a connector of Sample No. 9 is 864. Sample Nos. 8 and 9 are single-core fibers. The number of ferrule holes of each connector in each sample is 24. In each sample, evaluation results of the length L of the housing portion 43 are shown in Table 3.

TABLE 3

| | Total core number | Core number per fiber | Fiber number | $ID_{MAX}$ [mm] | Ferrule hole number of each connector | Connector number | Length [mm] of housing portion | Length [mm] of housing portion per core |
|---|---|---|---|---|---|---|---|---|
| No. 8 | 3456 | 1 | 3456 | 47 | 24 | 144 | 1500 | 0.43 |
| No. 11 | 3456 | 4 | 864 | 47 | 24 | 36 | 383 | 0.11 |

TABLE 3-continued

|  | Total core number | Core number per fiber | Fiber number | $ID_{MAX}$ [mm] | Ferrule hole number of each connector | Connector number | Length [mm] of housing portion | Length [mm] of housing portion per core |
|---|---|---|---|---|---|---|---|---|
| No. 12 | 3456 | 8 | 432 | 47 | 24 | 18 | 191 | 0.06 |
| No. 13 | 3456 | 12 | 288 | 47 | 24 | 12 | 128 | 0.04 |
| No. 9 | 864 | 1 | 864 | 25 | 24 | 36 | 650 | 0.75 |
| No. 14 | 864 | 4 | 216 | 25 | 24 | 9 | 179 | 0.21 |
| No. 15 | 864 | 8 | 108 | 25 | 24 | 5 | 89 | 0.10 |
| No. 16 | 864 | 12 | 72 | 25 | 24 | 3 | 60 | 0.07 |

It was confirmed that all of Sample Nos. 11 to 16 satisfy L/N<0.4 [mm]. On the other hand, a length of the housing portion 43 per core of Sample No. 8 is 0.43 [mm], and a length of the housing portion 43 per core of Sample No. 9 is 0.75 [mm]. It was confirmed that neither Sample No. 8 nor Sample No. 9 satisfies L/N<0.4 [mm]. Since Sample Nos. 8 and 9 are single-core fibers, the number of connectors 20 housed in the housing portion 43 is increased, and as a result, the length L of the housing portion 43 becomes long. For example, the length L of the housing portion in Sample No. 8 is 3.9 times or more longer than the length L of the housing portion 43 in Sample No. 11. The length L of the housing portion 43 in Sample No. 9 is 3.6 times or more longer than the length L of the housing portion 43 in Sample No. 14. When the number of connectors 20 and the length L of the housing portion 43 in Sample Nos. 8 and 9 are reduced, for example, when the number of connectors 20 is 24, it is necessary to use an expensive connector such as a connector including 144 fibers in Sample No. 8, or a multi-fiber connector that collectively splices 36 optical fibers in Sample No. 9. However, these multi-fiber connectors are generally expensive, and it is also difficult to ensure the hole forming accuracy. Accordingly, the cable 1 with a connector (Sample Nos. 11 to 16) provided with the optical fibers 10, which are multicore fibers, and the connectors 20, which are multi-fiber connectors, can satisfy L/N<0.4 [mm] without using any expensive multi-fiber connector.

Although the present disclosure has been described in detail with reference to a specific embodiment, it will be apparent to those skilled in the art that various changes and modifications can be made without departing from the spirit and scope of the present disclosure. The numbers, positions, shapes, and the like of components described above are not limited to the embodiment described above and can be changed to suitable numbers, positions, shapes, and the like on a premise that the present disclosure is achieved.

What is claimed is:

1. A cable with a connector, comprising:
a plurality of multicore optical fibers;
a plurality of multi-fiber connectors attached to ends of the plurality of multicore optical fibers, and
a sheath that collectively covers the plurality of multicore optical fibers,
wherein the plurality of multicore optical fibers includes a first multicore optical fiber, a second multicore optical fiber, and a third multicore optical fiber,
the plurality of multi-fiber connectors includes a first optical connector attached to one end of the first multicore optical fiber, a second optical connector attached to one end of the second multicore optical fiber, and a third optical connector attached to one end of the third multicore optical fiber,
a length of the first connector and a length of the first multicore optical fiber from one end of the sheath to the first connector combined are shorter than a length of the second multicore optical fiber from the one end of the sheath to the second connector,
a core number density of each of the plurality of multi-fiber connectors is 2 cores/mm$^2$ or more, the core number density of each of the plurality of multi-fiber connectors is defined as a total number of cores in multicore optical fibers of the plurality of multicore optical fibers that a multi-fiber connector of the plurality of multi-fiber connectors is attached to at one end, divided by a cross-sectional area, where the cross-sectional area is an area of the multi-fiber connector perpendicular to the multicore optical fibers of the plurality of multicore optical fibers included in the multi-fiber connector of the plurality of multi-fiber connectors,
a length of the second connector and the length of the second multicore optical fiber from the one end of the sheath to the second connector combined are shorter than a length of the third multicore optical fiber from the one end of the sheath to the third connector, and
the plurality of multi-fiber connectors are arranged at regular intervals in a longitudinal direction of the cable.

2. The cable with a connector according to claim 1, wherein
the plurality of connectors are grouped together in a predetermined number to form at least one multiple connector.

3. The cable with a connector according to claim 2, wherein
the at least one multiple connector includes a first multiple connector and a second multiple connector, and
a length of the multicore optical fiber from the one end of the sheath to the first multiple connector is different from a length of the multicore optical fiber from the one end of the sheath to the second multiple connector.

4. The cable with a connector according to claim 1, further comprising:
a tensile member embedded in the sheath or a tensile member covered with the sheath together with the plurality of multicore optical fibers; and
a towing tool including:
a housing portion housing the plurality of multicore optical fibers and the plurality of connectors;
a towing portion provided at one end of the housing portion; and
a tensile member gripping portion connected to the towing portion via a tension transmitting member and gripping the tensile member.

5. The cable with a connector according to claim 4, wherein a maximum value $ID_{MAX}$ of an inner diameter of the housing portion and a total number N of cores in the cable with a connector satisfy an inequality: $(ID_{MAX}/2)^2 \times \pi/N < 0.25$ [mm²].

6. The cable with a connector according to claim 4, wherein
   a maximum value of the inner diameter of the housing portion is smaller than an outer diameter of the sheath.

7. The cable with a connector according to claim 4, wherein
   a length L of the housing portion in a longitudinal direction of the cable with a connector and the total number N of cores in the cable with a connector satisfy an inequality: $L/N < 0.4$ [mm].

8. The cable with a connector according to claim 4, wherein
   the housing portion includes a first housing portion and a second housing portion,
   the first housing portion houses the plurality of multicore optical fibers in a bent state, and
   the second housing portion houses the plurality of multicore optical fibers along the longitudinal direction of the cable with a connector, and houses the plurality of connectors.

* * * * *